3,461,980
ROTARY DRILLING OF WELLS
John Kelly, Jr., Arlington, Tex., assignor to Mobil Oil Corporation, a corporation of New York
No Drawing. Filed Sept. 15, 1967, Ser. No. 668,185
Int. Cl. E21b 21/04
U.S. Cl. 175—70                    18 Claims

ABSTRACT OF THE DISCLOSURE

This specification discloses a rotary drilling process utilizing an aqueous-base mud in which a discrete slug of hydrophobic liquid containing an oil-wetting surfactant is introduced into the mud column. The treating slug is circulated into the well annulus where it contacts one or more formations penetrated by the well and renders them water-resistant. The treating slug may be preceded and followed by buffer systems comprised of aqueous and/or oleaginous liquids. Such liquids may be of a viscosity greater than that of the aqueous-base drilling mud. The densities of the treating slug may be near that of the aqueous-base mud.

BACKGROUND OF THE INVENTION

Field of the invention

This invention relates to the drilling of wells into the earth's crust, and more particularly to a new and improved method of rotary drilling with an aqueous-base drilling mud.

Description of the prior art

Typically, wells are extended into the earth's crust to desired subterranean locations, e.g., oil- and/or gas-bearing formations, through the application of rotary drilling techniques. In the rotary drilling of a well a drilling fluid is circulated through the well in order to remove the cuttings therefrom. This is accomplished by pumping the drilling fluid downwardly through a rotating drill string within the well and thence upwardly to the surface of the well through the annulus surrounding the drill string. The drill cuttings are entrained in the drilling fluid and withdrawn from the well with the fluid. In addition to removing cuttings, the drilling fluid also serves other functions such as cooling the drill bit.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either an aqueous base mud or an oil-base mud. While oil-base muds are used most advantageously where the formation being drilled is a suspected oil or gas producer, it usually is desirable for reasons of economy to use an aqueous-base mud throughout most of the drilling operation. The aqueous-base mud may be a fresh-water mud, a salt-water mud, or an emulsion mud formed by an oil-in-water emulsion in which the water is the continuous phase.

One difficulty which has long been experienced with the use of aqueous-base drilling muds is the deleterious effects of the water in the drilling mud on certain formations penetrated by the drilling procedure. Typical of these formations are the so-called soft shales which are relatively unstable clay-containing formations. Such shale formations, when contacted by the aqueous drilling fluid, tend to hydrate such that sloughing occurs. This sloughing or influx of the shale or other earth formation into the well during the drilling operation many times leads to serious and costly problems, such as stuck drill pipe, undesired hole enlargement, and even such extreme instability as to cause loss of the well because of inability to proceed with the drilling operation.

SUMMARY OF THE INVENTION

The present invention provides a method of drilling with an aqueous-base drilling mud whereby one or more formations susceptible to the deleterious effects of such aqueous-base muds are rendered water-resistant through contact with an oil-wetting surfactant and a hydrophobic liquid. The invention is practiced in conjunction with a rotary drilling procedure in which an aqueous-base drilling mud is introduced into a drill string within the well and circulated downwardly through the string and thence upwardly through the well annulus surrounding the string. In accordance with the invention, the introduction of the aqueous-base mud into the drill string is terminated and a discrete slug of a hydrophobic liquid containing an oil-wetting surfactant is introduced into the drill string. The introduction of the aqueous-base drilling mud into the drill string then is resumed and the slug of hydrophobic liquid and surfactant is circulated through the drill string and into the annulus. As the slug travels upwardly through the annulus the shale or other formations to be treated are coated by the hydrophobic liquid and the oil-wetting surfactant and rendered water-resistant.

DESCRIPTION OF SPECIFIC EMBODIMENTS

In rotary drilling there is employed a drill string which carries on its lower end a drill bit having one or more openings for the discharge of drilling mud from the drill string into the well. The drill string extends through a rotary table on the floor of the drilling rig and is supported by the rig through the means of a drawworks system. Typically, the drilling mud is withdrawn from a mud pit near the surface of the well and passed into the drill string via a rotary swivel. The drilling mud is pumped downwardly through the drill string and outwardly into the well bore through the outlet ports in the drill bit. The mud then is pumped to the surface of the well through the annulus between the drill string and the wall of the well. At the surface the mud may be passed through a suitable separation zone where drill cuttings and other entrained solids may be separated and thence passed to the mud pit for reintroduction into the drilling string.

As noted previously, the present invention provides a method for increasing the stability of formations penetrated by a well during the drilling thereof with an aqueous-base mud. By the term "aqueous-base mud," as used herein and in the appended claims, is meant a drilling mud having an aqueous liquid base and containing suspended solids therein. The aqueous liquid may be fresh water, salt water, e.g., an aqueous solution of sodium chloride or calcium chloride or other salts, or an oil-in-water emulsion in which the water forms the continuous phase. Such emulsions as are utilized in the formulation of aqueous-base drilling muds typically contain on the order of 2 to 25 percent by volume of oil in the discontinuous phase.

The suspended solids in the drilling mud typically take the form of clays of the kaolinite, montmorillonite, or illite groups. Such clays are utilized to impart desirable thixotropic properties to the drilling mud and also serve to coat the walls of the well with an impermeable sheath, commonly termed a "filter cake" which prevents the loss of the drilling mud from the well into the formations penetrated by the well. Examplary of the clays which may be utilized in aqueous-base drilling muds is bentonite which is a member of the montmorillonite group. The bentonite is dispersed within the aqueous-base liquid as colloidal particles and imparts various degrees of thixotropy to the mud.

In addition to the clays such as mentioned above, the aqueous drilling mud also may contain one or more weighting agents which function to increase the density of the mud such that it will offset high pressures which may be encountered during the drilling operation. Examples of such weighting agents are the heavy minerals such as barite (barium sulfate) and other minerals such as hematite (ferrous oxide) and galena (lead sulfide). In addition, somewhat lighter materials such as finely divided silicate silt are sometimes added to aqueous-base drilling muds as weighting agents.

In the practice of the present invention, one or more of the geological formations penetrated by the well are treated in conjunction with the drilling operations in order to render such formation or formations resistant to the deleterious effects of the aqueous-base drilling mud. During normal drilling operations aqueous-base mud is introduced into the drill string within the well and a column of the mud is circulated through the drill string and upwardly through the well annulus to the surface of the well where it is removed. In accordance with this invention, the introduction of the mud into the drill string is temporarily suspended and thereafter a discrete treating slug of a hydrophobic liquid containing an oil-wetting surfactant is introduced into the drill string. Thereafter, the aqueous-base drilling mud is again introduced into the drill string and the slug of hydrophobic liquid entrained within the column of mud is circulated down through the drill string and thence into the annulus where it contacts the formation or formations to be treated. The oil-wetting surfactant, aided by the hydrophobic liquid, forms a protective film over the formation surfaces exposed within the well and renders such surfaces resistant to the deleterious effects of the aqueous-base drilling mud.

As will be understood by those skilled in the art, by the term "oil-wetting surfactant," as used herein and in the appended claims, is meant a surface-active agent which has oleophilic characteristics and which upon adsorption on the exposed formation surfaces within the well causes such surfaces to be preferentially oil-wettable, i.e., more readily wetted by oil than by water. The oil-wetting surfactant which is adsorbed onto the face of the formation typically will form a monomolecular film in which oleophilic hydrocarbon groups are directed outwardly away from the solid surfaces of the formation. Thus, the surfactant adsorbed onto the face of the formation exposed within the well renders it water-resistant.

As the oil-wetting suractant is adsorbed on the face of the formation, the formation also is contacted by the hydrophobic liquid forming the discrete slug. This liquid increases the water-resistant characteristics of the formation and provides for the retention of these characteristics for a prolonged period of time. In this regard, the hydrophobic liquid forms a protective film over the adsorbed oil-wetting surfactant and thus greatly reduces desorption of the surfactant from the formation face by the aqueous-base mud.

The surfactant utilized in the present invention may be any agent, or a mixture of several compatible agents, which renders the exposed face of the subterranean formation preferentially oil-wettable. Illustrative of such surfactants are the higher alkyl quaternary ammonium salts having one or more long-chained alkyl groups. For example, the oil-wetting surfactant may be an alkyltrimethylammonium chloride or a dialkyldimethylammonium chloride in which the carbon chain length of the alkyl group or groups is from 8 to 18. Examples of commercially available alkyltrimethylammonium chlorides and dialkyldimethylammonium chlorides are Arquad–18 and Arquad–2HT–75, respectively, available from Armour Chemical Company.

Other suitable oil-wetting surfactants are the aliphatic polyethenoxy tertiary amines of the following general formula:

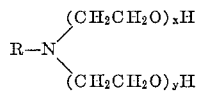

wherein:
R is an aliphatic group having from 12 to 18 carbon atoms, and
$x$ and $y$ each are within the range of 1 to 5.

Examples of commercially available ethenoxylated amines of this group are Ethomeen C/12, Ethomeen 18/12, and Ethomeen S/12 by Armour Chemical Company. Substituted ammonium salts formed as the reaction products of these ethenoxylated tertiary amines with organic or inorganic acids also may be used. Of these, the products formed by reaction with the high molecular weight monobasic acids normally exhibit greater oil solubility than the corresponding tertiary amines and are particularly useful.

As a further example of oil-wetting surfactants which may be used are ethenoxylated tertiary diamines of the general formula:

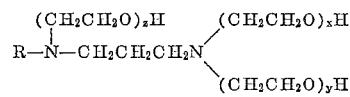

wherein:
R is an aliphatic group having a carbon chain length of 12 to 18, and
$x$, $y$, and $z$ each are within the range of 1 to 5.

A commercially available diamine of this type is Ethoduomeen T/13, available from Armour Chemical Company.

Additional oil-wetting surfactants which may be used in carrying out the invention are the polyvalent salts of the high molecular weight fatty acids such as palmitic, stearic, and oleic acid. Examples of such salts, commonly termed "heavy metal soaps," are aluminum oleate, zinc stearate and calcium stearate.

The hydrophobic liquid utilized in the present invention may be any liquid which, in the presence of the surfactant, will preferentially wet the formation surfaces in an aqueous environment. Thus, the hydrophobic liquid may be petroleum crude oil or gaseoline, naphtha, kerosine, diesel oil, or other oleaginous products resulting from the refining of petroleum. Other liquids which may be used include carbon tetrachloride, trichloroethylene, and perchloroethylene. Also, aqueous emulsions of the above-identified or other hydrophobic liquids in which the aqueous medium is in the dispersed phase may be used. Such emulsions, commonly called "inverted emulsions" are well known to those skilled in the art. It will be recognized that the above-designated surfactants and liquids are exemplary only and that other suitable hydrophobic liquids and oil-wetting surfactants may be utilized in carrying out the invention.

By introducing the oil-wetting surfactant and the hydrophobic liquid into the well as a discrete slug, the possibility of significant contact between the surfactant and the clay particles or other solids suspended within the drilling mud is greatly reduced. Thus, reversal of the wettability characteristics of such suspended solids is avoided with the attendant result that the treating chemicals which may be in the drilling mud will continue to perform their usual functions and various clays and weighting agents which may be present will retain their water-wet condition and thus remain suspended in the aqueous-base mud.

In order to further ensure against the surfactant contacting the suspended mud solids, it is preferred in carrying out the invention to immediately precede the treating slug of hydrophobic liquid and surfactant with a slug of a liquid buffer system. The buffer system includes a liquid which desirably is imiscible with either the hydrophobic liquid or the aqueous-base mud in order to reduce intermixing which may ultimately lead to a portion of the hydrophobic liquid and the surfactant being entrained directly within the mud. The buffer system preferably comprises an oleaginous liquid such as diesel oil, kerosine, or crude oil. Thus, the buffer system may be formed by the same liquid as is used in forming the surfactant-hydrophobic liquid slug, it being recognized that in this case the buffer liquid should be free of such surfactant.

The buffer system may comprise an aqueous liquid which is substantially free of suspended solids or which at least has a suspended solids content which is much lower than that of the drilling mud. This aqueous buffer liquid, which may be used alone or with an oleaginous liquid such as those described above, may be the same as that used in formulating the drilling mud and thus may take the form of fresh water, salt water, etc. The aqueous buffer liquid, in addition to isolating the slug of surfactant and carrier fluid from the aqueous-base mud, will also function to pretreat the shales of other unstable formations which ultimately are contacted by the slug of hydrophobic liquid and oil-wetting surfactant. In this regard, the aqueous liquid buffer will function as an effective flushing agent and will at least partially remove any filter cake which may be formed over the section of the well to be treated.

As noted above, the buffer system may comprise one or both of the above-described oleaginous and aqueous liquids. Where the buffer system comprises an aqueous component and an oleaginous component, it is preferred that the aqueous liquid be introduced first. Thus, the buffer system would be comprised of an aqueous liquid followed by an oleaginous liquid.

Desirably, a second buffer system is introduced into the drill string immediately after the oil-wetting surfactant and hydrophobic liquid mixture in order to reduce the possibility of the surfactant contacting the solids suspended in the following drilling mud. This second system may take any of the forms described above with regard to the first buffer system. Thus, the second buffer system may consist of an aqueous liquid, an oleaginous liquid, or a combination of both. Where both aqueous and oleaginous liquids are used, the oleaginous liquid should be introduced first behind the treating slug and followed by the aqueous buffer slug which in turn is followed by the drilling mud.

The liquid slug or slugs forming each buffer system may be introduced into the drill string in any desired amounts. Preferably, each buffer system should be introduced into the drill string in an amount sufficient to form a column of at least 100 feet in the annulus in order to provide for good separation between the drilling mud and the treating slug.

In order to further minimize mixing of the slug of hydrophobic liquid and surfactant with the drilling mud, the first buffer system may present a liquid slug which exhibits a viscosity greater than that of the mud. Thus, either the aqueous buffer liquid or the oleaginous buffer liquid or both may be treated with gelling agents as necessary in order to increase their viscosity to a level higher than the viscosity of the mud. This will provide a better sweep of the mud ahead of the treatment slug and will retard mixing of the buffer system and the treatment slug with the mud preceding the slug. Desirably, the second buffer system will similarly present a liquid slug exhibiting a viscosity greater than that of the drilling mud in order to minimize mixing with the drilling mud following the treating slug.

In order to further minimize mixing of the slug of hydrophobic liquid and surfactant with the drilling mud and also to avoid significant changes in the hydrostatic pressure imposed by the mud column, the treating slug and/or buffer systems may be selected so as to exhibit densities close to that of the drilling mud as it is introduced into the well. Whille as a practical matter some latitude must be allowed in this regard, it usually will be practical, particularly where the mud used is not unusually heavy, to provide a treating slug and/or buffer system having a density within ±2 pounds per gallon of the density of the drilling mud and this is preferred. Thus, if the drilling mud introduced into the drill string is a 12-pound mud, i.e., has a density of 12 pounds per gallon, the density of the treating slug and/or buffer system should be within the range of 10 to 14 pounds per gallon.

Aqueous-base muds used in rotary drilling operations range in density from approximately 9 to 18 pounds per gallon with most muds being within the range of 9 to 14 pounds per gallon. In some cases a treating liquid and oleaginous buffer may be selected so as to exhibit densities near that of the mud density. For example, if a 12-pound mud is used, trichloroethylene, which has a density slightly in excess of 12 pounds per gallon, may be used as a treating liquid and also as an oleaginous buffer liquid. A suitable aqueous buffer liquid in this case would be a saturated aqueous solution of calcium chloride which has a density slightly less than 12 pounds per gallon.

Usually, it will be desirable for reasons of economy to use a mineral oil such as crude oil or diesel oil as the treating liquid and also as the oleaginous buffer liquid. Such mineral oils typically exhibit densities on the order of 7 to 8 pounds per gallon or less and in this case a solid weighting agent may be added as necessary to increase the density of the oleaginous buffer liquid. Weighting agents such as barite, galena, or hematite may be used. In most instances it will be desirable to avoid the use of such weighting agents in the treating liquid containing the oil-wetting surfactant since they will present adsorption sites which will compete with the formation faces exposed in the well for the surfactant.

In addition to the oil-wetting surfactant, asphalt may be added to the diesel oil or other hydrophobic liquid. The asphalt functions to provide an additional protective coating over the exposed formation face which further increases the water-resistant characteristics of the formation. Such asphalt may be the residual bitumens obtained from the refining of petroleum crude oils. Also, the so-called "blown asphalts" may be utilized. As will be understood by those skilled in the art, by the term "blown asphalt" is meant asphaltic bitumens which have undergone an oxidative treatment by being exposed to air, oxygen, or some other oxidative environment, usually at elevated temperatures. A preferred asphalt concentration is within the range of from 10 to 100 pounds of asphalt per 100 gallons of hydrophobic liquid, although greater concentrations may be used if desired.

The concentration of the oil-wetting surfactant in the hydrophobic liquid may vary widely depending upon the nature of the well under treatment and the type of surfactant used. In general, however, it will be desirable to incorporate the surfactant within the hydrophobic liquid in a concentration within the range of ½ to 40 pounds of surfactant per 100 gallons of hydrophobic liquid. In any case, the concentration of the oil-wetting surfactant in the liquid should be such that a substantial excess of liquid is provided in order to provide an adequate coating of liquid over the surfactant film adsorbed on the exposed formation face. This will prevent an unacceptably high rate of desorption of the surfactant from the formation face by the aqueous-base mud.

The surfactant may be mixed with the hydrophobic liquid to form either a solution or dispersion in the hydrophobic liquid depending upon the solubility characteristics of the surfactant. For example, the quaternary ammonium salts such as described above are water-soluble, oil-dispersible compounds and may be incorporated in the hydrophobic liquid as a dispersion. The above-described ethenoxylated amines vary from oil to water solubility and may be dissolved or dispersed in the hydrophobic liquid as indicated.

It is preferred to periodically repeat the introduction of the slug of hydrophobic liquid and oil-wetting surfactant in the column of drilling mud as the drilling operation proceeds. The frequency of treatment will vary widely from well to well, depending upon local conditions. It is desirable to inject the hydrophobic liquid and the oil-wetting surfactant in adequate quantities and at sufficient intervals to ensure coverage of the open hole not covered by the preceding treatment. As a general rule, it will be desired to repeat the treatment at intervals such that a slug of hydrophobic liquid containing an oil-wetting surfactant is introduced into the well once for each 30 to 90 feet of well drilled. The total volume of hydrophobic liquid-surfactant slug used for each such treatment should desirably be within the range of 1 to 30 barrels.

A preferred technique for ensuring that adequate amounts of the hydrophobic liquid and surfactant are used is to introduce the treating slug into the mud column in an amount such that it retains its identity as a discrete slug throughout the circulation cycle within the well. Thus, a portion of the introduced slug is withdrawn from the annulus with the drilling mud. This normally will ensure that adequate amounts of treating agents are used to provide sufficient coverage for the wall of the well. As the slug of treating material reaches the surface of the well it may be passed through a separating zone such as a shale shaker to remove drill cuttings therefrom and then passed to a storage zone for further recirculation in the mud column.

Having described specific embodiments of the instant invention it will be understood that further modifications thereof may be suggested to those skilled in the art, and it is intended to cover all such modifications as fall within the scope of the appended claims.

What is claimed is:

1. In the drilling of a well penetrating a subterranean earth formation exposed in said well, the method comprising:
    (a) introducing an aqueous-base drilling mud into a drill string within said well and circulating a column of said mud through said drill string and upwardly through the well annulus surrounding said drill string to the surface of said well,
    (b) terminating the introduction of said mud into said drill string,
    (c) introducing into said drill string a discrete slug of a treating mixture of a hydrophobic liquid and an oil-weting surfactant, and
    (d) resuming the introduction of said mud into said drill string and circulating said slug through said drill string and into said annulus whereby said formation is coated by said liquid and said surfactant and rendered water-resistant.

2. The method of claim 1, wherein the volume of said slug of treating mixture is within the range of 1 to 30 barrels.

3. The method of claim 2, wherein steps (b), (c), and (d) are repeated at a drilling interval within the range of 30 to 90 feet.

4. The method of claim 1, wherein the density of said slug is within the range of ±2 pounds per gallon of the density of said aqueous-base mud.

5. The method of claim 1, wherein said hydrophobic liquid contains asphalt.

6. The method of claim 1, wherein said slug is circulated upwardly through said annulus to the surface of said well.

7. The method of claim 1, further comprising, between steps (b) and (c), introducing into said drill string a liquid buffer system comprised of a liquid which is immiscible with one of said hydrophobic liquid and said aqueous-base mud.

8. The method of claim 7, wherein said hydrophobic liquid contains asphalt.

9. The method of claim 7, wherein said buffer system is comprised of a liquid having a viscosity greater than the viscosity of said aqueous-base mud.

10. The method of claim 7, wherein said buffer system comprises an oleaginous liquid.

11. The method of claim 7, wherein said buffer system comprises a substantially solids-free aqueous-base liquid 12. The method of claim 7, wherein said buffer system comprises a substantially solids-free aqueous-base liquid followed by an oleaginous liquid.

13. The method of claim 12 wherein at least one of said oleaginous liquid and said aqueous-base liquid exhibits a viscosity greater than the viscosity of said aqueous-base mud.

14. The method of claim 7, further comprising, between steps (c) and (d), introducing into said drill string a second liquid buffer system comprised of a liquid which is immiscible with one of said hydrophobic liquid and said aqueous-base mud.

15. The method of claim 14, wherein said second buffer system comprises a liquid having a viscosity greater than the viscosity of the drilling mud.

16. The method of claim 14, wherein each of said first and second buffer systems is introduced in an amount sufficient to form a column at least 100 feet in said annulus.

17. The method of claim 14, wherein each of said first and second buffer systems is comprised of a liquid exhibiting a density within the range of ±2 pounds per gallon of the density of said drilling mud.

18. The method of claim 14, wherein said hydrophobic liquid contains asphalt.

References Cited

UNITED STATES PATENTS

| | | | |
|---|---|---|---|
| 2,800,963 | 7/1957 | Roberts et al. | 166—2.9 X |
| 2,995,514 | 8/1961 | Jordan et al. | 252—8.5 |
| 3,040,822 | 6/1962 | Graham et al. | 175—66 X |
| 3,343,599 | 9/1967 | Eddins et al. | 175—65 X |

STEPHEN J. NOVOSAD, Primary Examiner

U.S. Cl. X.R.
166—30; 175—72